(12) United States Patent
Jia et al.

(10) Patent No.: US 11,055,887 B2
(45) Date of Patent: Jul. 6, 2021

(54) MODIFYING DIGITAL CONTENT WITH DIGITAL EFFECTS USING FACIAL SKIN MASK

(71) Applicant: Adobe Inc., San Jose, CA (US)

(72) Inventors: Yumin Jia, San Jose, CA (US); Xin Lu, Mountain View, CA (US); Jen-Chan Chien, Saratoga, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/205,010

(22) Filed: Nov. 29, 2018

(65) Prior Publication Data

US 2020/0175736 A1 Jun. 4, 2020

(51) Int. Cl.
| | |
|---|---|
| *G06T 11/60* | (2006.01) |
| *G06K 9/00* | (2006.01) |
| *G06F 3/0484* | (2013.01) |
| *G06T 7/11* | (2017.01) |
| *G06T 7/70* | (2017.01) |
| *G06T 7/12* | (2017.01) |

(52) U.S. Cl.
CPC .......... *G06T 11/60* (2013.01); *G06F 3/04845* (2013.01); *G06K 9/00234* (2013.01); *G06K 9/00268* (2013.01); *G06T 7/11* (2017.01); *G06T 7/12* (2017.01); *G06T 7/70* (2017.01); *G06T 2200/24* (2013.01); *G06T 2207/30201* (2013.01)

(58) Field of Classification Search
CPC ... G06T 11/60; G06T 7/70; G06T 7/11; G06T 7/12; G06T 2207/30201; G06T 2200/24; G06K 9/00268; G06K 9/00234; G06K 9/00362; G06F 3/04845

USPC ........................................................ 345/629
See application file for complete search history.

(56) References Cited

U.S. PATENT DOCUMENTS

| | | | | |
|---|---|---|---|---|
| 2007/0258656 A1* | 11/2007 | Aarabi | ............... | H04N 1/00167 382/254 |
| 2008/0189625 A1* | 8/2008 | Zuta | .................... | H04N 21/4318 715/753 |
| 2009/0196475 A1* | 8/2009 | Demirli | .............. | G06K 9/00281 382/128 |
| 2010/0061631 A1* | 3/2010 | Omori | .................. | H04N 5/2351 382/170 |
| 2011/0091071 A1* | 4/2011 | Sabe | .................. | G06K 9/00288 382/103 |
| 2012/0262485 A1* | 10/2012 | Raghoebardajal | ...... | G06T 7/136 345/633 |
| 2013/0011049 A1* | 1/2013 | Kimura | ................... | G06T 7/194 382/155 |

(Continued)

*Primary Examiner* — Jacinta M Crawford
*Assistant Examiner* — Kim Thanh T Tran
(74) *Attorney, Agent, or Firm* — FIG. 1 Patents

(57) ABSTRACT

Facial skin mask generated by a digital content creation system is described. The digital content creation system includes digital effects on skin in facial regions of digital content with efficiency and accuracy. Upon identifying a facial region within digital content, the system generates a first regional skin mask, a second regional skin mask, and combines both of the first and second regional skin masks to generate a facial skin mask indicative of skin of the identified facial regions depicted in digital content. The digital content creation system then modifies digital content by applying user selected digital effects to the skin of the facial region using the generated facial skin mask.

20 Claims, 14 Drawing Sheets
(11 of 14 Drawing Sheet(s) Filed in Color)

(56) References Cited

U.S. PATENT DOCUMENTS

| | | | |
|---|---|---|---|
| 2014/0016823 A1* | 1/2014 | Ye | G06T 15/503 |
| | | | 382/103 |
| 2014/0049563 A1* | 2/2014 | Tobin | G06F 3/012 |
| | | | 345/649 |
| 2016/0140383 A1* | 5/2016 | Kim | G06K 9/00281 |
| | | | 382/118 |
| 2017/0076142 A1* | 3/2017 | Chang | G06T 7/90 |
| 2017/0243334 A1* | 8/2017 | Grossinger | G06T 5/005 |

* cited by examiner

MODIFYING DIGITAL CONTENT WITH DIGITAL EFFECTS USING FACIAL SKIN MASK

BACKGROUND

Digital content creation systems include a variety of digital design and editing tools that enable the generation and inclusion of digital effects to digital content via, e.g. a computing device. These tools may be presented in a variety of visual guides and panels with which content creators interact, e.g., via a user interface. Content creators use these tools to include a variety of digital effects such as digital paint, digital lighting, digital smoothing (among other effects) to the digital content in order to transform its appearance. Digital effects can be included in or applied to the entire digital content, specific objects in the content, or select regions of these objects. For example, digital effects can be applied on faces or facial regions depicted in digital content.

Conventional digital design and editing tools configured to include digital effects on facial regions are integrated with tools that create a digital layer covering the facial regions. This digital layer is conventionally referred to as a facial skin mask and serves to identify skin in the facial regions. More importantly, the facial skin mask facilitates inclusion of digital effects on the skin in these regions. However, conventional systems present numerous challenges. For example, the run time needed to create an accurate facial skin mask using conventional systems prevents conventional systems from effectively utilizing facial skin masks to add digital effects to skin in digital content, e.g. digital images, digital videos etc., in real time. Conventional attempts to increase the speed with which these facial skin masks are generated result in the inaccurate inclusion of digital effects to digital content. In sum, conventional systems make the addition of digital effects to skin in digital content inefficient and cumbersome.

SUMMARY

Facial skin masks generated by the digital content creation system described herein enable content creation systems to include digital effects on skin in facial regions depicted in digital content with efficiency and accuracy. In operation, the digital content creation system first identifies a facial region depicted in digital content. After the system identifies a facial region within the digital content, the system generates a first regional skin mask on a first region of the identified facial region (e.g. a forehead of the facial region) and a second regional skin mask on a second region of the facial region (e.g. a remainder of the facial region). The system then generates a facial skin mask by combining the first and second regional skin masks. The facial skin mask that results from the combination of the first and second regional skin masks effectively identifies skin in the facial region. The generated facial skin mask is indicative of the identified skin.

Moreover, having generated the facial skin mask, the digital content creation system modifies the digital content by accurately applying the digital effect on the skin present in both the first and second regions of the facial region in real time.

This summary introduces a selection of concepts in a simplified form that are further described in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
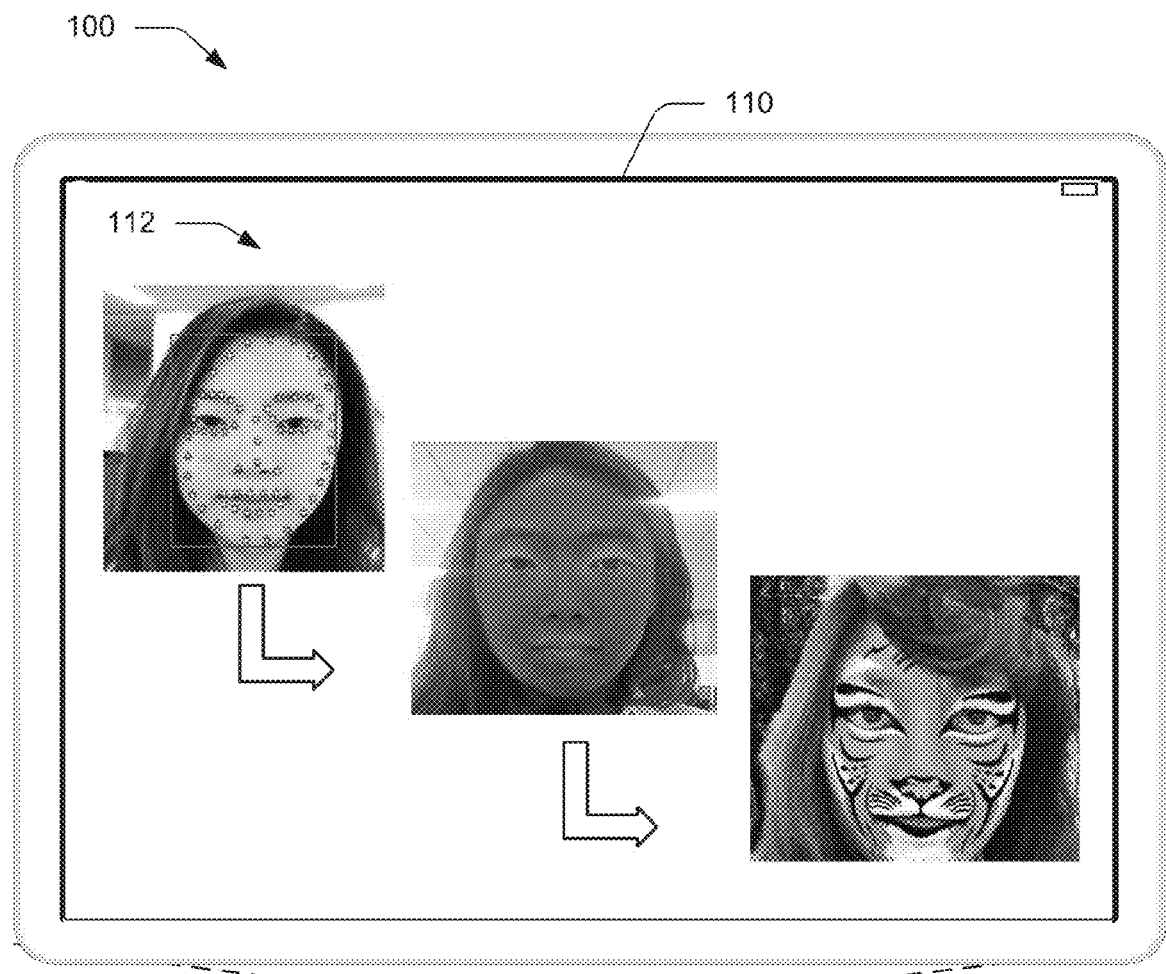
FIG. 1 is an illustration of an environment in an example implementation that is operable to employ the digital content creation system described herein.
Figure 1:
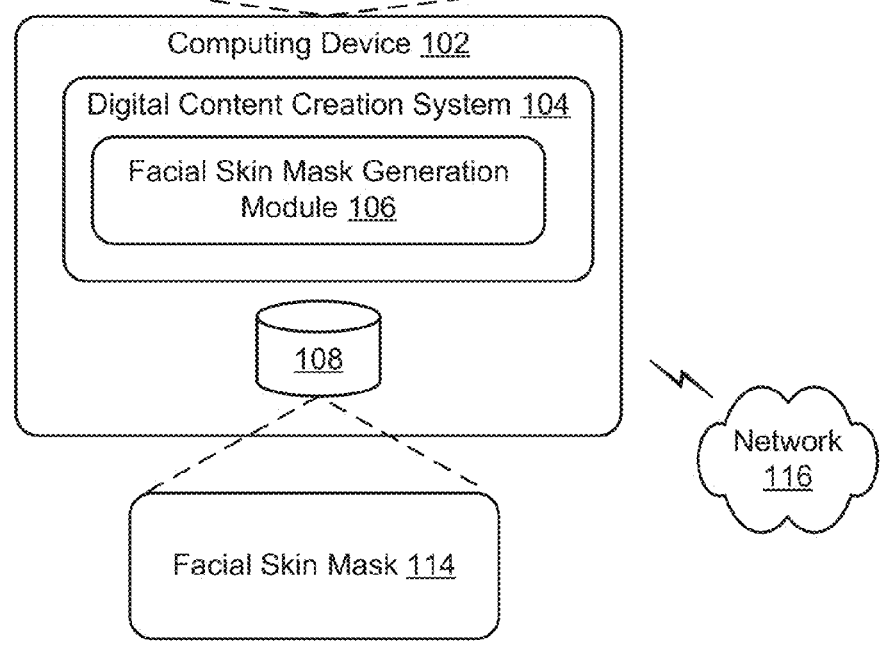

Challenges with adding digital effects to facial regions in digital content include accurately identifying skin of the facial regions and accurately adding digital effects to this skin in real time. Conventional systems that apply digital effects to facial regions consume a majority of computing resources to carry out this application, leaving a relatively small amount of the resources for generating facial skin masks. These resources are insufficient for conventional systems to generate a facial skin mask that (1) accurately identifies the skin on a facial region, (2) is used to accurately apply digital effects to the identified skin, and (3) facilitates inclusion of this accurate digital effect to the skin of facial region in real time. And even if the accuracy of identifying skin increases, the run time of conventional systems to generate a facial skin mask that precisely identifies skin of the facial region is substantial. As such, conventional systems cannot be used to accurately apply digital effects in real time to skin on facial regions in digital content, e.g. digital video, digital images, etc. Conventional systems also fail detect, in real time, position changes of a facial region, and make adjustments to or regenerate facial skin masks in real time based on the detected changes.

Effective identification of skin in the facial region is an important part of the accuracy of the facial skin mask. Effectively identifying skin on certain portions of the facial region—the forehead for example—poses a unique set of challenges. Primarily because the forehead includes hair and skin interspersed in a random pattern, from which the skin must be accurately and efficiently segmented. The digital content creation system described herein achieves accurate and efficient segmentation of skin from hair by executing a segmentation algorithm selectively on one region of the facial region (e.g., the forehead) while identifying skin of a second region (e.g., a remainder of the face) using a different technique. This selective application of the segmentation algorithm improves computational efficiency of facial skin mask generation because use of this more accurate, and consequently more resource intensive, segmentation algorithm is limited to application in relation to one region rather than being used on an entirety of a face.

To overcome other challenges, modification of digital content with digital effects using facial skin masks is leveraged in a digital medium environment. The digital content creation system described herein generates a facial skin mask that accurately identifies the skin present in the facial regions, including, as stated above, in certain challenging portions, e.g. the forehead. In the following discussion, the digital content creation system is described as selectively applying a segmentation algorithm to a forehead and using a different technique to identify skin of a remainder of the face. Notably, the forehead and the remainder correspond to a first and second region, respectively, of a facial region. It is appreciated, however, that the first and second region may correspond to different regions of the face. For instance, the first region may correspond to a chin region of a face having a beard while the second region corresponds to a remainder of the face above the chin. For sake of clarity, though, the system is described with reference to a forehead portion and a remainder of the face.

In this context, consider that in one example, the described system initially identifies a facial region in the digital content. The facial region includes a forehead (first region) and a remainder (second region) of the facial region, e.g., a region of the face "below" the forehead which includes eyes, cheeks, mouth, and so forth. Given this, the described system generates a first regional skin mask for the forehead and a second regional skin mask for the remainder of the facial region. The described system further combines the first regional skin mask and the second regional skin mask to generate a facial skin mask that is indicative of skin present in the facial region. The generated facial skin mask accurately indicates skin present in the facial region.

In one or more implementations, the described system generates the facial skin mask using a segmentation algorithm, which enables the accurate identification of skin in the forehead of the facial region. The digital content creation system, in part using the segmentation algorithm, separates the skin from the hair on the forehead efficiently and in real time with a limited amount of computational resources. The system also identifies skin in the remainder of the facial region, in part, by tracing contours of the remainder of the facial region such that the traced contours are used to identify skin and exclude certain facial features, e.g. eyes and mouth. With this result, when the system receives a user selection of a digital effect to be applied to the facial region, the system is able to modify the digital content by applying the digital effect on the skin precisely and in real time using the generated facial skin mask. In one or more implementations, the digital effect is not applied to the excluded facial features, e.g. eyes and mouth.

Thus, the digital content creation system eliminates noticeable run-time delays of conventional systems, reduces digital design inefficiencies due in part to these delays, and reduces inaccuracies of conventionally-modified digital content. The described system also provides a facial skin mask that is more accurate and temporally coherent than the facial skin masks generated by conventional systems. Mainly because the described system leverages techniques that allow tracking in real time of changes in facial region positions, e.g. movement of an individual's face in digital content from one position to another, and generates, if necessary, another facial skin mask based on the detected position change. Finally, another advantage is that, unlike conventional systems, the system described herein is configured to assess, identify, and adapt to a variety of skin tones and features.

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of digital content creation system 104 in which the facial skin mask generation techniques described herein are employed. The illustrated environment 100 includes a computing device 102, which can be configured in a variety of ways.

The computing device 102, for instance, may be configured as a desktop computer, a laptop computer, a mobile device, e.g. assuming a handheld configuration such as a tablet or mobile phone as illustrated, and so forth. Thus, the computing device 102 may range from full resource devices with substantial memory and processor resources (e.g. personal computers, game consoles) to a low-resource device with limited memory and/or processing resources (e.g. mobile device). Computing device 102 is representative of a single computing device or a plurality of different devices, such as multiple servers utilized by a business to perform operations "over the cloud" as described in FIG. 10. Additionally, although illustrated as implemented locally at computing device 102, functionality of digital content creation system 104 may also be implemented as whole or part via functionality available via the network 116, such as part of web service or "in the cloud."

The computing device 102 is illustrated as including digital content creation system 104. The digital content creation system 104 is implemented at least partially in the hardware of the computing device 102 to generate facial skin mask 114, which is illustrated as being maintained in storage 108 of computing device 102. Facial skin mask 114 accurately identifies skin in facial regions included in digital content 112 and facilitates modification of digital content 112 by applying the digital effects on the skin included in the facial regions within the digital content and displays the modified digital content 112 on display device 110. The digital content creation system generates facial skin mask 114, using facial skin mask generation module 106, by generating a first regional skin mask and a second regional skin mask and combining these skin masks. The first and second regional skin masks identify skin in different parts of the facial region, including in the troublesome forehead portion of the facial region. The presence of the hair and skin interspersed in a random pattern on the forehead poses, as stated above, a challenge for conventional systems. Specifically, segmenting this random pattern into skin and hair in real time with limited computational resources creates run-time delays and design inefficiencies. The digital content creation system 104, however, addresses this challenge by generating facial skin mask 114 by executing multiple iterations of the segmentation algorithm-K-means algorithm-on the forehead of the facial region. The segmentation executed by the creation system, via the computing device 102, accurately separates the skin from hair on the forehead.

Although illustrated as implemented locally at the computing device 102, functionality of the digital content creation system 104 may be implemented in whole or in part through the functionality available via network 116, such as part of a web service or "in the cloud." In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Accurate Digital Effect Inclusion in Digital Content using Facial Skin Mask

Figure 2:
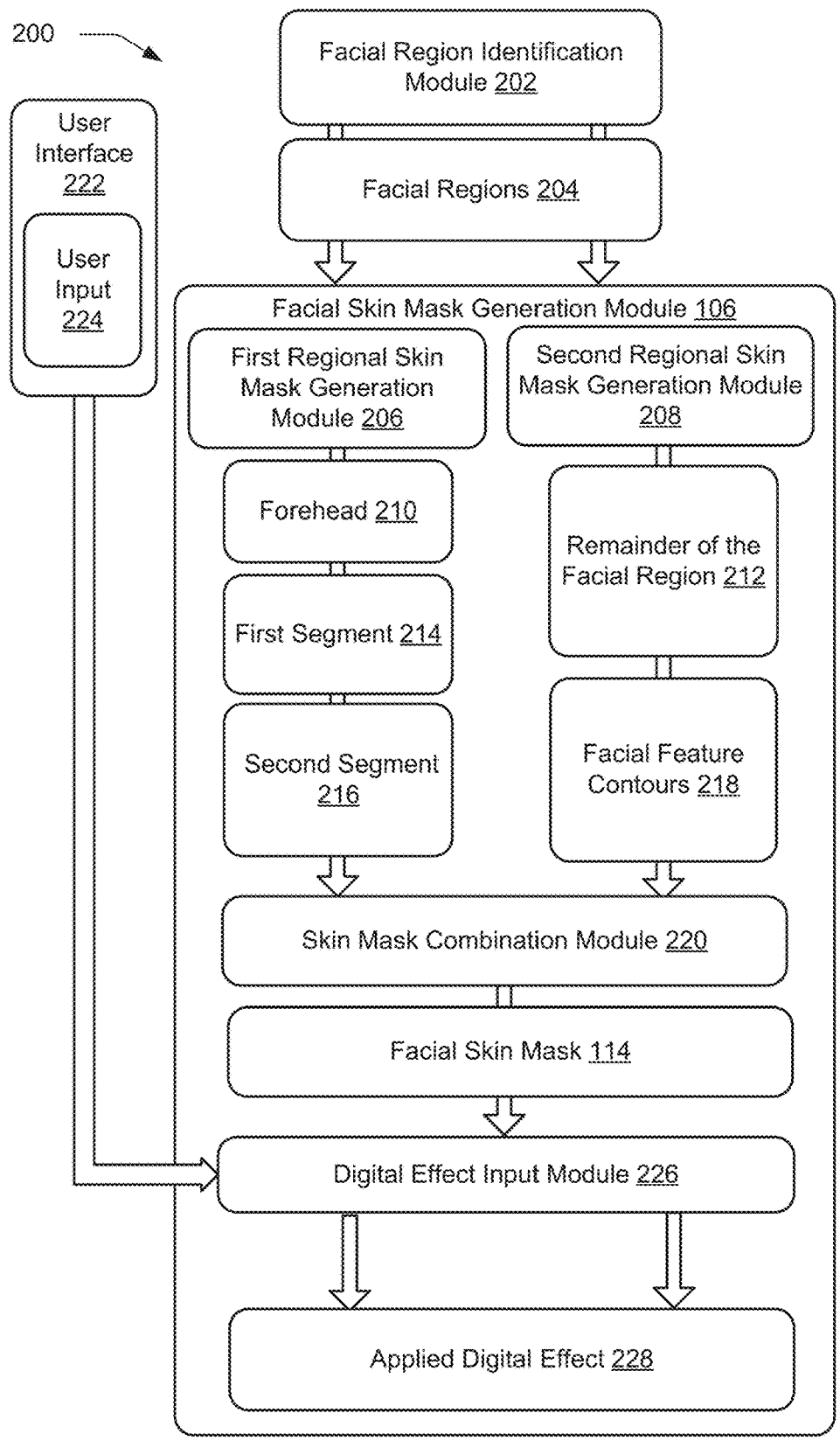
FIG. 2 depicts an example implementation of the digital content creation system of FIG. 1 in greater detail to support digital effect inclusion in digital content using a generated facial skin mask.
Figure 3:
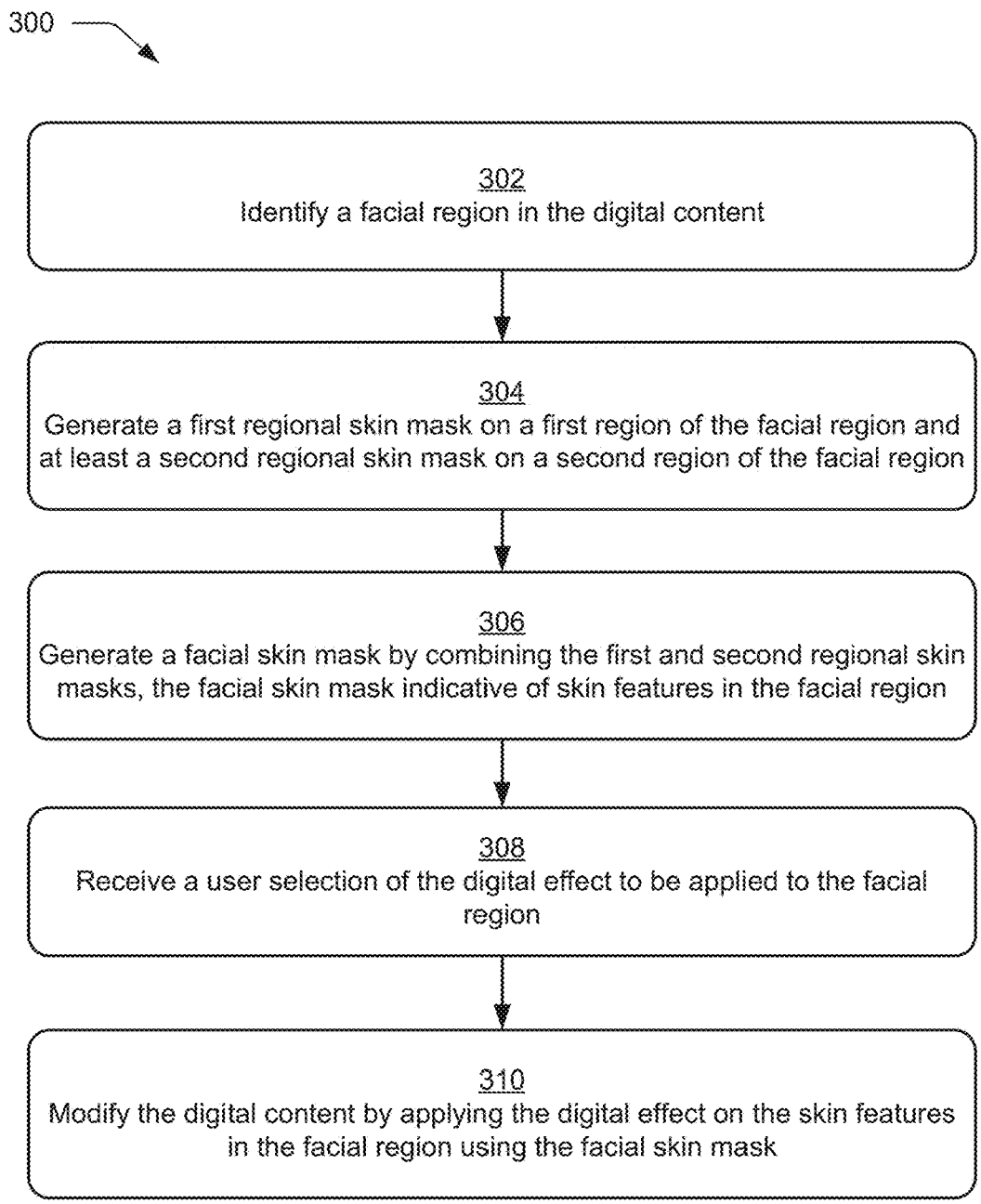
FIG. 3 is a flow diagram depicting a procedure in an example implementation in which the digital content creation system modifies digital content by applying a digital effect on skin in the facial region using the generated facial skin mask.

FIG. 2 depicts a system 200 in an example implementation in which operation of digital content creation system 104 is described in greater detail. FIG. 3 depicts a procedure 300 in an example implementation of the digital content creation system 104 generating facial skin mask 114 is described in greater detail.

The following discussion describes techniques that may be implemented utilizing the described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In the following discussion, reference is made interchangeably to FIGS. 2-10.

Figure 4:
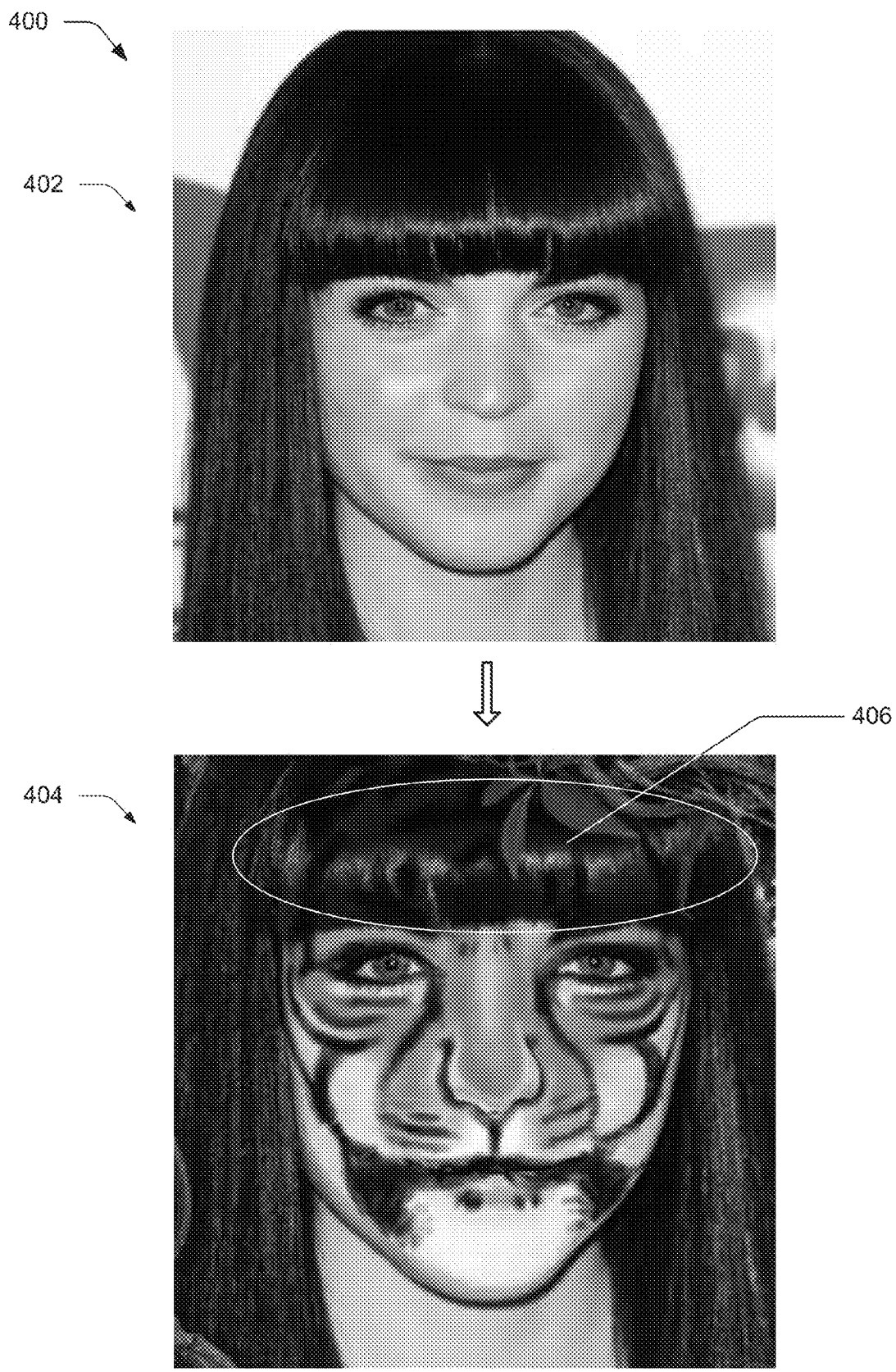
FIGS. 4 and 5 depict example deficiencies present in conventional systems of generating facial skin masks.
Figure 5:
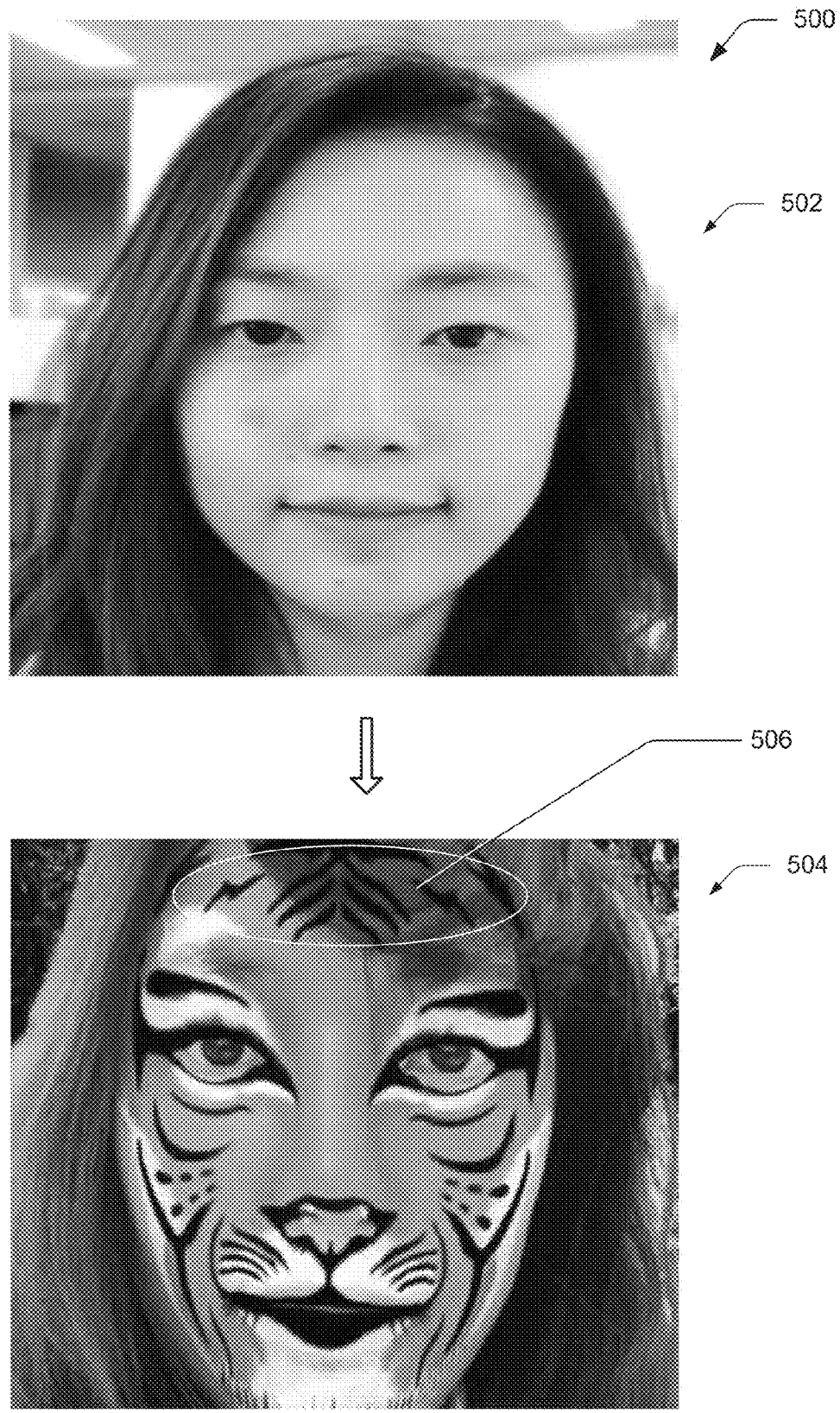

Prior to detailing the operation of the digital content creation system 104, a discussion of FIG. 4 and FIG. 5 is instructive. These figures depict the limitations present in applying digital effect to digital content with the use of facial skin masks generated by conventional systems. These limitations are illustrated using first and second stages 402 and 404 in example implementation 400 in FIG. 4, and first and second stages 502 and 504 depicted in example implementation 500 in FIG. 5. At first stages 402 and 502 respectively, digital content includes an image of an individual with a clearly visible facial region. At second stages 404 and 504 respectively, the result of applying digital effects using conventional systems is depicted. The digital effect—a tiger pattern in this instance—is inaccurately applied on hair 406 and hair 506 on the foreheads of the respective facial regions.

Figure 6A:
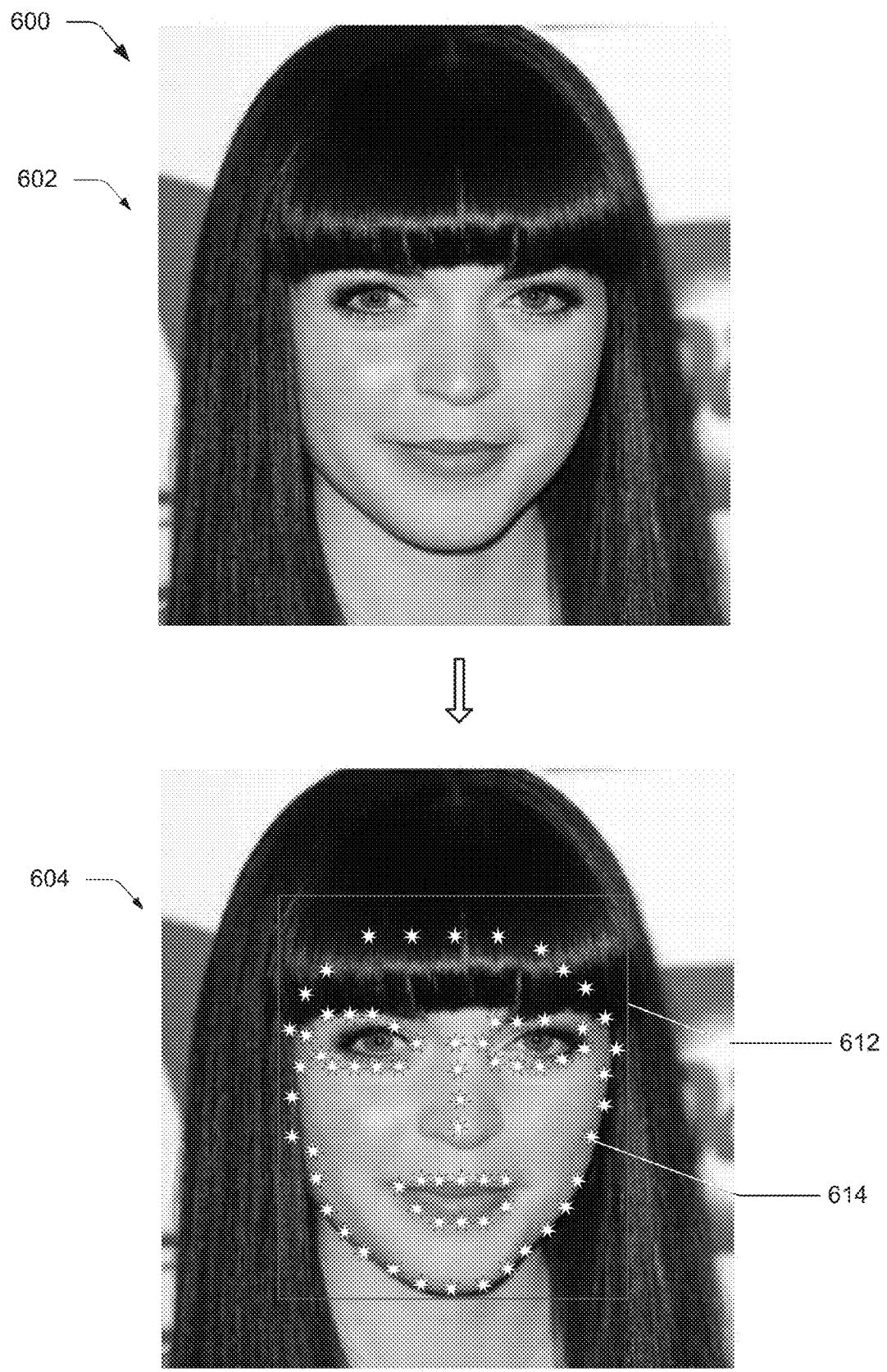
FIG. 6A depicts an example implementation of the digital content creation system, which identifies landmarks defining a facial region and generates a bounding box that demarks the perimeter of the facial region.
Figure 6B:
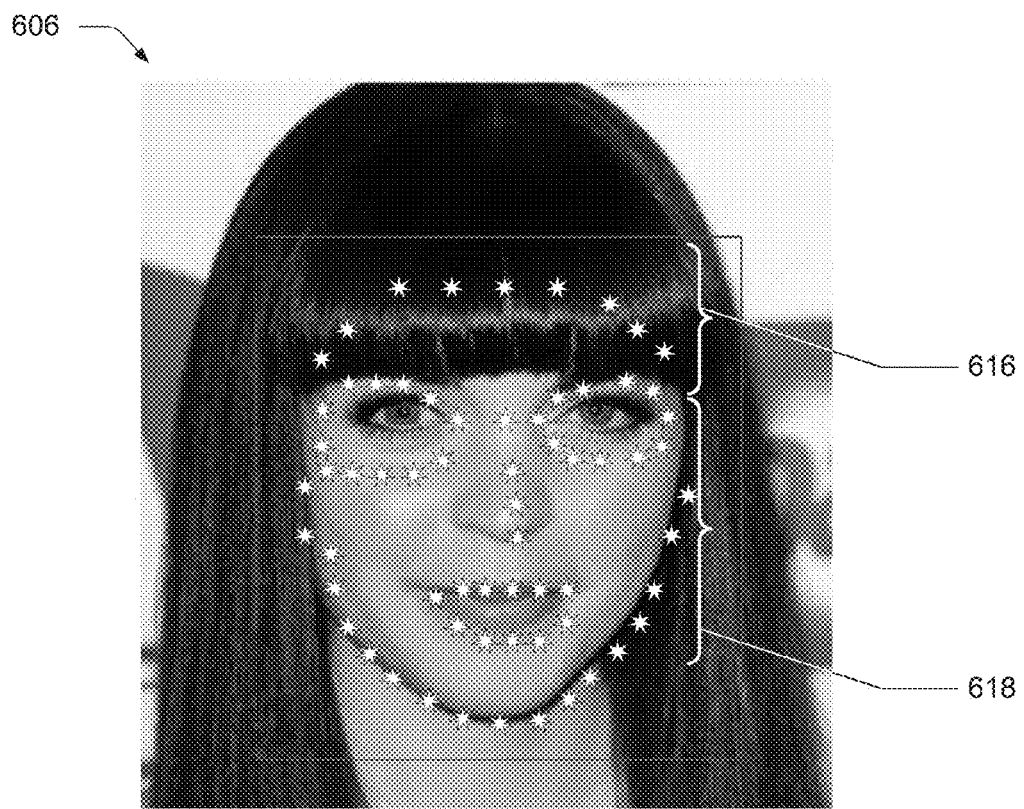
FIG. 6B depicts an example implementation of the digital content creation system that uses landmarks defining a forehead of the facial region and a remainder of the facial region to generate a facial skin mask that is indicative of skin of the entire facial region.
Figure 6B:
Figure 6C:
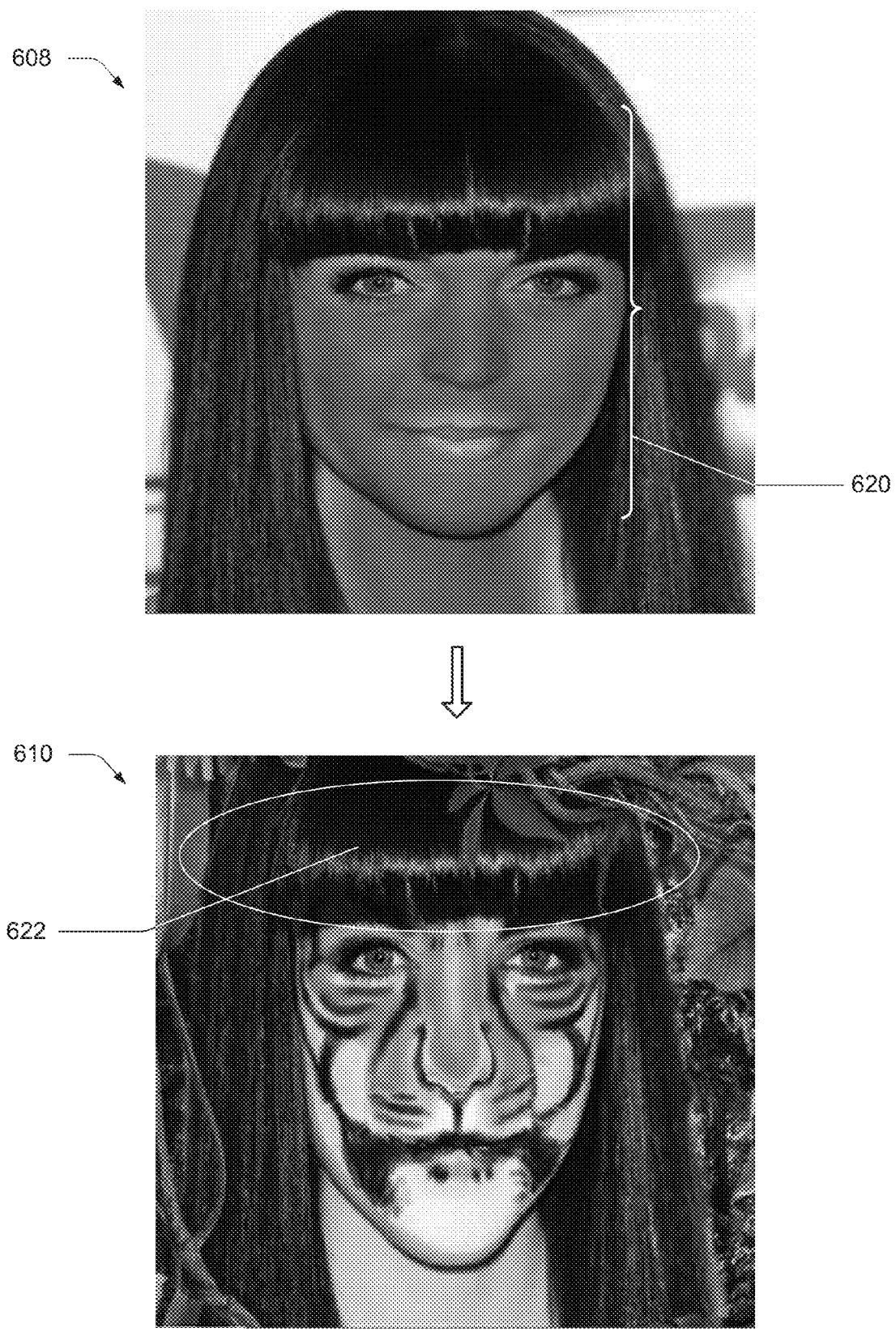
FIG. 6C depicts an example implementation of the digital content creation system that modifies digital content by applying a digital effect to skin of a facial region using the facial skin mask such that the digital effect is not applied to hair disposed on the forehead or on certain excluded facial features of the facial region, e.g. eyes.

FIGS. 6A-6C depict an example implementation 600 of the digital content creation system 104 that addresses the limitations of conventional systems depicted in FIGS. 4 and 5. A content creator's interaction with digital content via a computing device, is illustrated, in part, using first, second, third, fourth, and fifth stages 602, 604, 606, 608, and 610 of FIG. 6. At the first stage 602, digital content containing a visible facial region is depicted.

At second stage 604, facial region identification module 202 identifies a facial region in digital content (block 302). The facial region identification module 202 is configured to implement facial identification and facial tracking techniques that, when implemented, generate a bounding box 612 demarking the perimeter of the facial region. Additionally, facial tracking points, also referred to as landmarks 614, are also generated by the facial region identification module 202 and placed across various parts of the facial region. Red colored bounding box 612 demarks the perimeter of the facial region and landmarks 614, represented by star shaped markers scattered around the facial region, define the facial region's contours and identify facial features in the facial region, e.g. eyes and mouth. The landmarks, cumulatively, define the facial region. In one or more implementations, eyes and mouth will be excluded such that the facial skin mask will not appear on the eyes and mouth. Landmarks 614 defining the facial region are passed by the facial region identification module 202, using the computing device, to facial skin mask generation module 106. Facial skin mask generation module 106 includes a first regional skin mask generation module 206 and a second regional skin mask generation module 208.

At third stage 606, the first regional skin mask generation module 206 generates a first region skin mask using a first subset of landmarks 616 extracted from the landmarks and the second regional skin mask generation module 208 generates a second regional skin mask on a remainder of the facial region 212 that includes facial feature contours 218 and skin using a second subset of landmarks 618 (block 304). While the regional skin masks are labeled as first and second, they may be generated concurrently. Alternatively, the second regional skin mask may well be generated faster than the first regional skin mask, as the second regional skin mask generation module 208 generates the second regional skin mask that identifies skin in the remainder of the facial region—a region that lacks hair and skin interspersed in a random pattern.

The second regional skin mask generation module 208 generates the second regional skin mask over a portion of the facial region that does not include the forehead (i.e. the remainder of the facial region) in two steps. First, the second regional skin mask generation module 208 extracts, via the computing device, a subset of landmarks that define the remainder of the facial region (second subset), which has one or more facial features, e.g. eyes and mouth, and skin included in the remainder of the facial region. Next, the second regional skin mask generation module 208 identifies, via the computing device, facial feature contours and skin of the remainder of the facial region based on the second subset of landmarks. The traced contours are used to identify portions of the facial region that correspond to the skin and portions of the facial region that correspond to facial features such as eyes and mouth, which will be excluded from the second regional skin mask. The second regional skin mask generation module utilizes these traced contours to generate the second regional skin mask, which identifies the skin within the remainder of the facial region accurately and in real time.

Having generated the second regional skin mask, the first regional skin mask generation module 206 now generates the first regional skin mask. The first regional skin mask generation module 206, using the first regional skin mask, identifies the skin in the forehead by segmenting the interspersed hair and skin in the forehead accurately and in real time into a first segment that corresponds to the hair and a second segment that corresponds to the skin. This segmentation process is performed on forehead depicted in third stage 606. The forehead, as depicted, primarily includes hair interspersed with small wedges of skin.

As stated above, conventional facial skin mask generation techniques find segmenting the hair from the skin in the forehead of facial regions accurately and in real time particularly challenging. The first regional skin mask generation module 206 of digital content creation system 104 addresses this problem using multiple iterations of the K-means algorithm and information gathered from the skin identified in the second regional skin mask. This process will be explained in further detail below.

To accurately separate the skin from the hair in the forehead, the first regional skin mask generation module 206 extracts the first subset of landmarks 616 defining the forehead. Then the first regional skin mask generation module identifies, via the computing device, pixels associated with each landmark included in the first subset. The processing of these pixels using K-means is detailed in the algorithms that follows.

Having identified the pixels associated with the forehead ("$I_F$"), the first regional skin mask generation module 206 partitions the pixels into two clusters $S_1$ and $S_2$. Cluster $S_1$ includes pixels that correspond to the hair on the forehead and cluster $S_2$ includes pixels that correspond to the skin on the forehead. In order to accurately separate the skin from the hair, the first regional skin mask generation module 206 minimizes the sum-of-squares within pixel clusters $S_1$ and $S_2$. The algorithm executed by the first regional skin mask generation module 206 to minimize the sum-of-squares within each cluster is:

$$\underset{S}{\operatorname{argmin}} \sum_{i=0}^{n} \sum_{p_i \in S_i} \|p_i - \mu_i\|_2^2$$

Prior to explaining the processing of the algorithm, a brief explanation of the variables included in the algorithm is instructive. A plurality of pixels (labeled $p_1 \ldots p_n$) are associated with and define the forehead $I_F$. Each of these pixels is a three dimensional vector represented by variable $p_i$. $P_i$ is indicative of pixels $p_1$-$p_n$. The variable $\mu_i$ represents the average of all pixels included in a particular cluster $S_i$. In other words, $\mu_i$ of $S_i$ represents mean values $\mu_1$ and $\mu_2$ of clusters $S_1$ and $S_2$, respectively.

The first regional skin mask generation module 206 of the facial skin mask processes the pixels using the K-means algorithm in multiple steps. First, the first regional skin mask generation module 206 initializes, via the computing device, mean values $\mu_1$ and $\mu_2$, which represent an initial mean value of each of clusters $S_1$ and $S_2$. The first regional skin mask generation module 206 calculates the initial mean values $\mu_1$ and $\mu_2$ in part based on the generation of the second regional skin mask, which provides the first regional skin mask generation module 206 with prior knowledge of skin included in the remainder of the facial region. Next, each pixel in the first subset that defines the forehead is initially assigned, by the first regional skin mask generation module 206, to either clusters $S_1$ or $S_2$.

It is noted that when initially assigned, pixels that represent hair that may be included in cluster $S_2$, which should include skin pixels, and pixels that represent skin may be initially assigned to $S_1$, which should include hair pixels. This is however, the first step of the K-means algorithm When the first regional skin mask generation module 206 completes the processing of multiple iterations of the K-means algorithm on the pixels included in clusters $S_1$ and $S_2$, pixels that represent hair in the forehead will included in cluster $S_1$ and pixels that represent skin will be included in cluster $S_2$.

The second step—the assignment of pixels—is represented by the below algorithm:

$$S_i(t) = p_i : \|p_i - \mu_i(t)\|_2^2 \leq : \|p_j - \mu_j(t)\|_2^2 \forall j, 1 \leq j \leq 2$$

After initially assigning each pixel to either cluster $S_1$ or cluster $S_2$, the first regional skin mask generation module 206 calculates new mean values based on the initial pixel assignments to clusters $S_1$ and $S_2$. The first regional skin mask generation module 206 calculates the new mean values by implementing, via the computing device, the below algorithm:

$$\mu_i^{(t+1)} = \frac{1}{S_i^{(t)}} \sum_{p_j \in S_i^{(t)}} p_j$$

Having calculated the new mean values, the first regional skin mask generation module 206 compares the value of each pixel, irrespective of whether it is assigned to cluster $S_1$ or $S_2$, to the mean values of each of cluster $S_1$ and cluster $S_2$. And if the first regional skin mask generation module 206 determines that the value of a pixel initially assigned to cluster $S_1$ has a value that is closer to the new mean value of cluster $S_2$, that pixel is reassigned from its initial assignment in cluster $S_1$ to cluster $S_2$. Pixels may also be reassigned from $S_2$ to $S_1$ depending on the proximity of a particular pixel value to the newly calculated mean value.

Thereafter, the first regional skin mask generation module 206 processes multiple iterations of (1) updating the mean values of clusters $S_1$ and $S_2$, (2) comparing the values of pixels in each of clusters $S_1$ and $S_2$, and (3) either reassigning the pixels to a different cluster or maintaining the cluster assignment of the pixels. This process—K-means—is repeated until the first regional skin mask generation module 206 determines that pixels that are assigned to clusters $S_1$ and $S_2$ do not have to be reassigned. In other words, the value of each pixel included in a cluster is closer to the mean value of the cluster to which it is assigned, than to the mean value of the other cluster. This results in convergence of the pixels—a scenario in which pixels assigned to $S_1$ and $S_2$ maintain their assignments. Convergence also signifies the first regional skin mask generation module 206 successfully minimizing the sum-of-squares within clusters $S_1$ and $S_2$. In this way, the first regional skin mask generation module 206 accurately segments the landmarks defining the forehead 210 into a first segment 214, e.g. $S_1$, that corresponds to hair in the forehead and a second segment 216, e.g. $S_2$, that correspond to skin in the forehead. Moreover, the segmentation occurs in real time.

Next, at fourth stage 608, skin mask combination module 220 of facial skin mask generation module 106 combines, via the computing device, the first regional skin mask and second regional skin mask to generate a facial skin mask that is indicative of the skin present in the facial region (block 306). As depicted in FIG. 6B, the facial region, as compared to third stage 606, is shown to include a brown colored covering, i.e. facial skin mask 620, that has accurately identified skin in the entire facial region.

At fifth stage 610, digital effect input module 226 receives a user selection or user input 224 of the digital effect 228, via user interface 222, to be applied to the facial region (block 308). Digital effects could include one or more of digital paint, digital skin tone, digital lighting, or digital smoothing, each of which modifies the appearance of digital content. It is also noted that a variety of digital effects in addition to digital paint, digital skin tone, digital lighting, and digital smoothing can be applied to digital images without departing from the spirit or scope of the described techniques. However, the precision with which the effect is applied to the digital content improves design efficiency, and facilitates the creation of digital content with intricate and complex patterns of colors and designs. Moreover, enabling the addition of digital effects in real time further improves user experience and efficiency. In essence, the facial skin mask generation module 106 enables content creators to precisely apply digital effects to facial regions 204 in digital content in real time.

When digital effect input module 226 receives the user selection of the digital effect 228, the facial skin mask generation module 106 modifies the digital content by applying the digital effect 228 on the skin in the facial region using the facial skin mask generated by skin mask combination module 220 (block 310). At fifth stage 610 depicted in FIG. 6C, the facial skin mask generation module 106 is shown to accurately apply the user selected digital effect 228—tiger pattern in this instance—on the skin present in the facial region without applying the digital effect 228 on the hair 622 on the forehead of the facial region. This is in contrast to digital effects being applied using conventional systems depicted in FIG. 4, in which the same tiger pattern is inaccurately applied to hair 406 found on the forehead of the facial region.

Figure 7A:
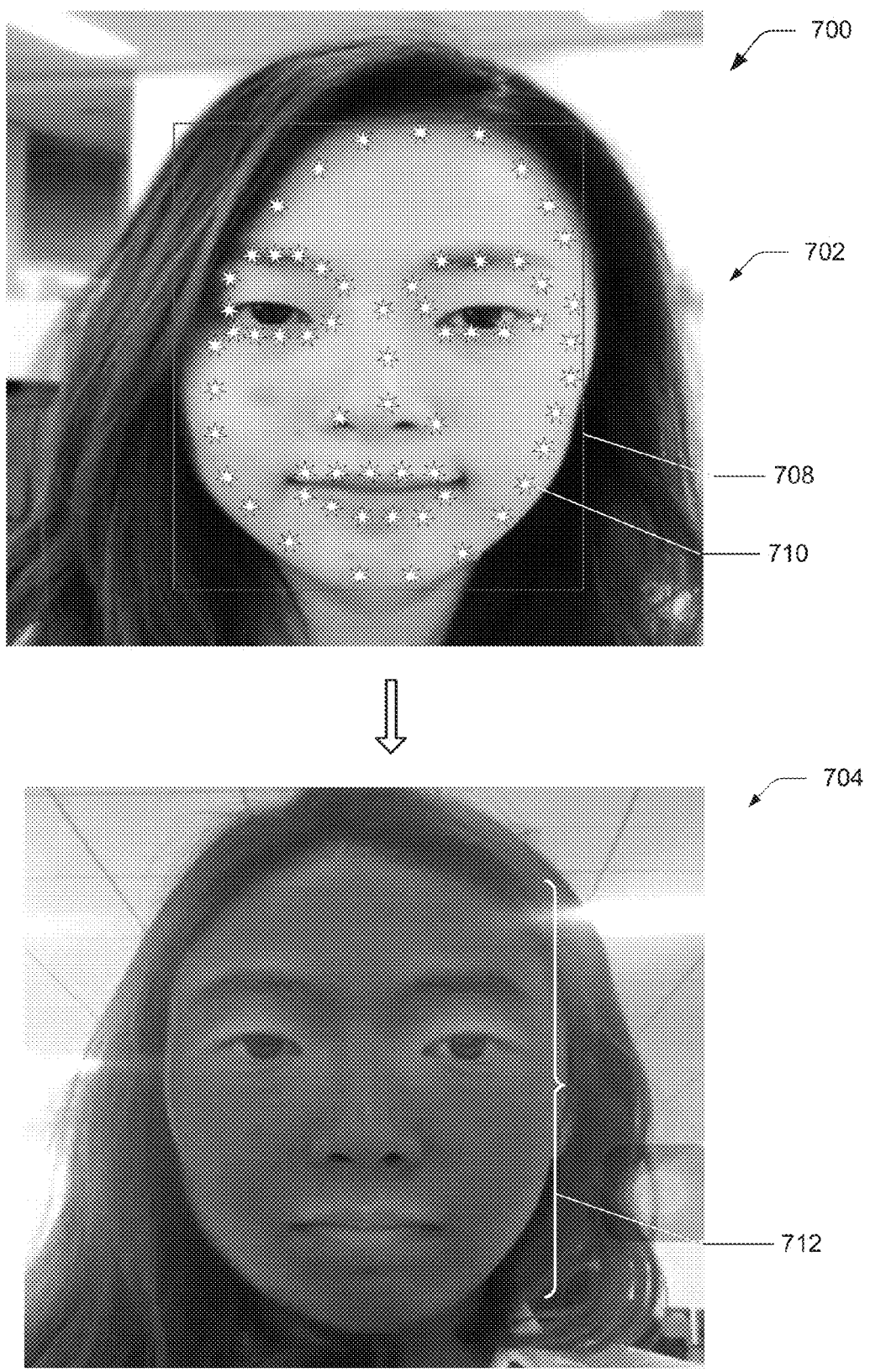
FIG. 7A depicts an example implementation of the digital content creation system, which identifies landmarks defining a facial region and generates a bounding box that demarks the perimeter of the facial region.
Figure 7B:
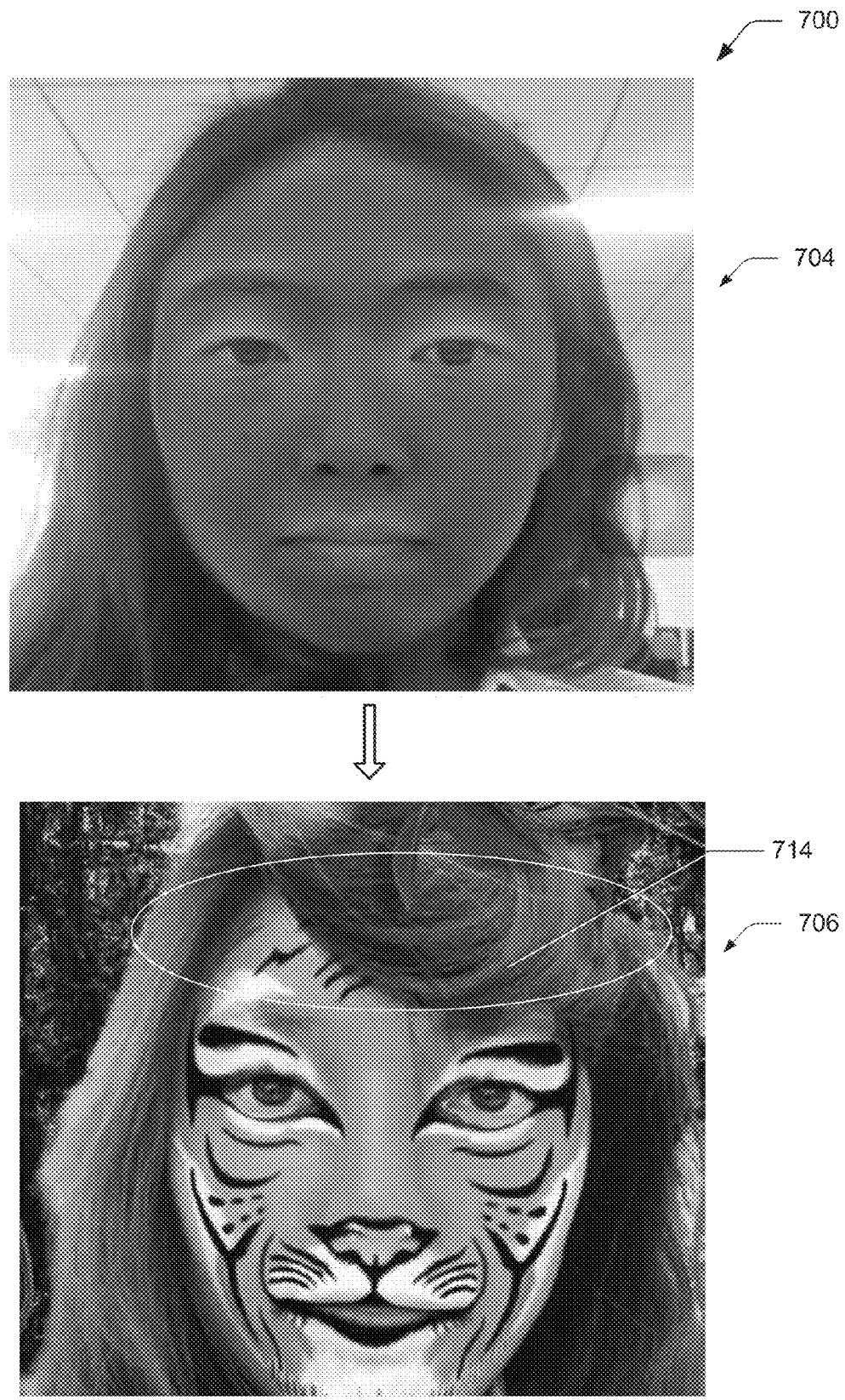
FIG. 7B depicts an example implementation of the digital content creation system that modifies digital content by applying a digital effect to skin of a facial region using the facial skin mask such that the digital effect is not applied to hair disposed on the forehead or on certain excluded facial features of the facial region, e.g. eyes and mouth.

FIGS. 7A and 7B another example implementation 700 of digital content creation system 104 that addresses the limitations of conventional systems. A content creator's interaction with digital content via a computing device, is illustrated, using first, second, and third stages 702, 704, and 706. At the first stage 702, digital content containing a visible facial region is depicted, and facial region identification module 202 is configured to implement facial identification and facial tracking techniques that, when implemented, generate a bounding box demarking the perimeter of the facial region. Additionally, the facial region identification module 202 generates landmarks 710 that are placed across various parts of the facial region. Red colored bounding box 708 demarks the perimeter of the facial region and the star shaped markers scattered around the facial region depict landmarks 710 that designate facial feature contours 218 and skin in the remainder of the facial region, and skin and hair of the forehead.

At second stage 704, a facial skin mask 712, generated by facial skin mask generation module 106, is depicted as being indicative of the skin present in the facial region, excluding certain facial features, e.g. eyes and mouth. Finally, third stage 706, as depicted in FIG. 7B, shows the modification of the digital content by applying a digital effect—tiger pattern—on the skin present in the facial region without applying the digital effect on the hair of the forehead of the facial region. The facial skin mask generation module 106 does not misapply the tiger pattern on hair 714 of forehead of the facial region.

Figure 8:
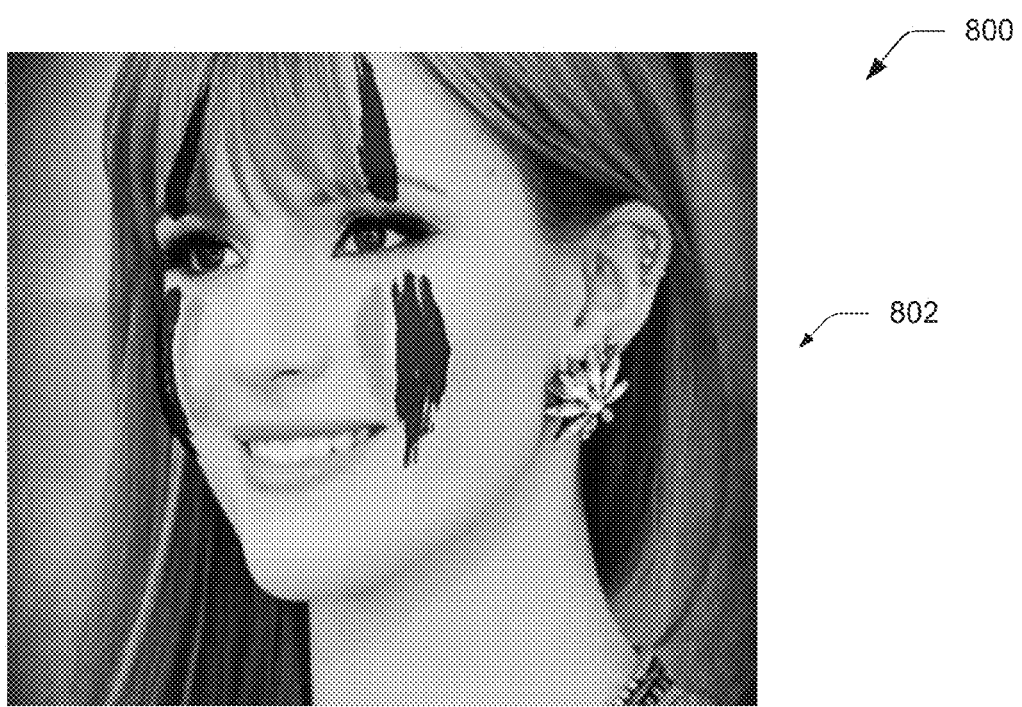
FIG. 8 depicts an example comparison between application of a digital effect to a facial region including to hair disposed on a forehead and application of a digital effect to the facial region without applying the digital effect to the hair disposed on the forehead or on certain excluded facial features of the facial region, e.g. eyes and mouth.
Figure 8:
Figure 8:

FIG. 8 depicts an example implementation 800 of the digital content creation system 104 addressing the limitations of conventional systems, depicted in first and second stages 802 and 804. First stage 802 represents the inclusion of a digital effect—digital paint in blue and yellow colors—being misapplied by conventional systems on hair present on the forehead of the facial region of digital content. In clear contrast, in second stage 804, the digital content creation system 104, via computing device 102, generates a facial skin mask that modifies digital content by applying the same blue and yellow colored digital paint on the skin present in the forehead of the facial region without applying the blue and yellow colored digital paint on hair 806.

In this way, digital content creation system 104 overcomes the limitations present in conventional systems and enables content creators to generate a facial skin mask that accurately identifies skin in the facial region and facilitates the application of digital effects on the identified skin accurately and in real time.

Temporally Accurate Facial Skin Mask Generation

Figure 9A:
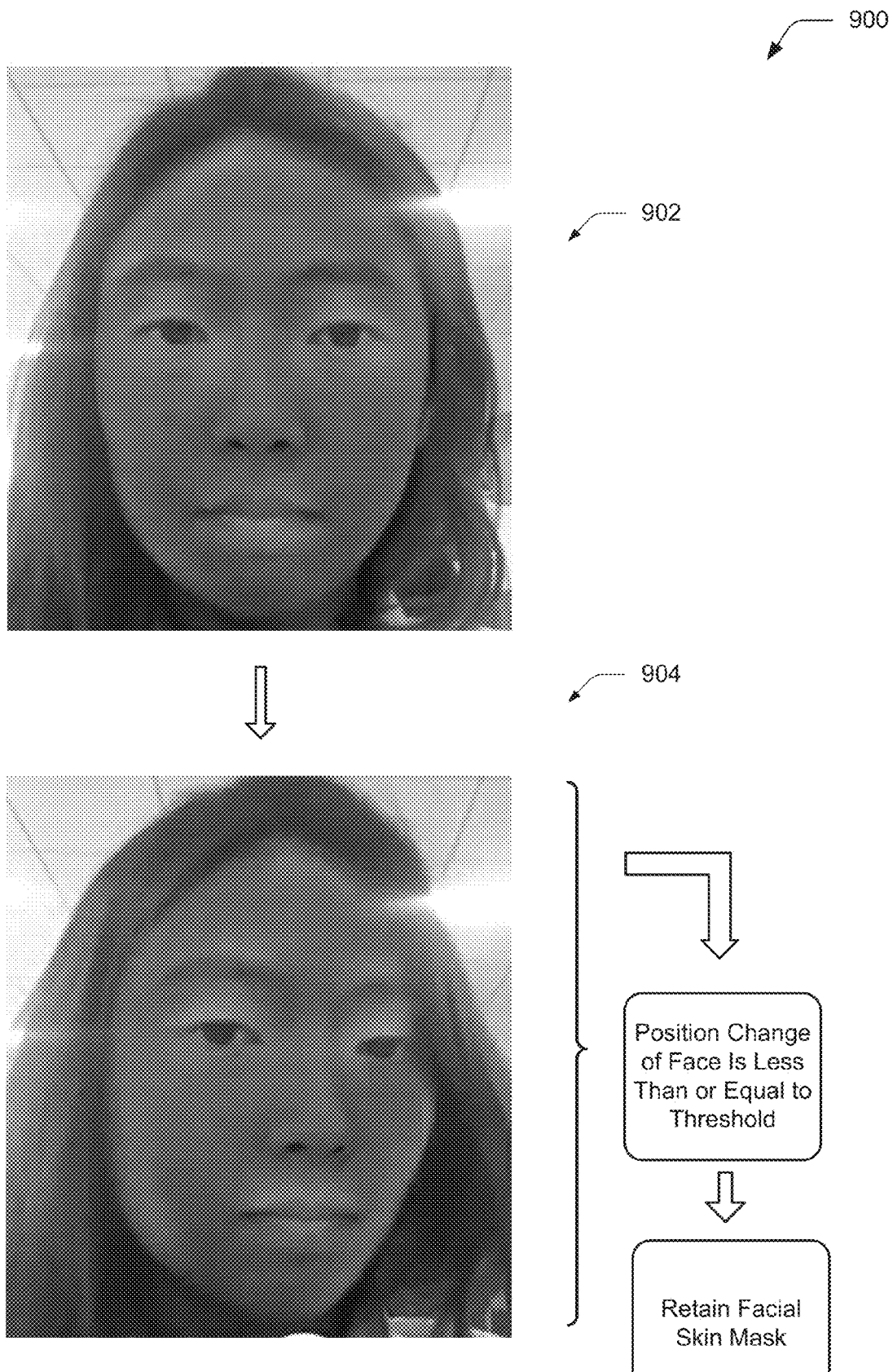
FIG. 9A depicts an example implementation of the digital content creation system that retains a generated facial skin mask upon detecting a position change of the facial region within the digital content that does not satisfy a predetermined threshold.
Figure 9B:
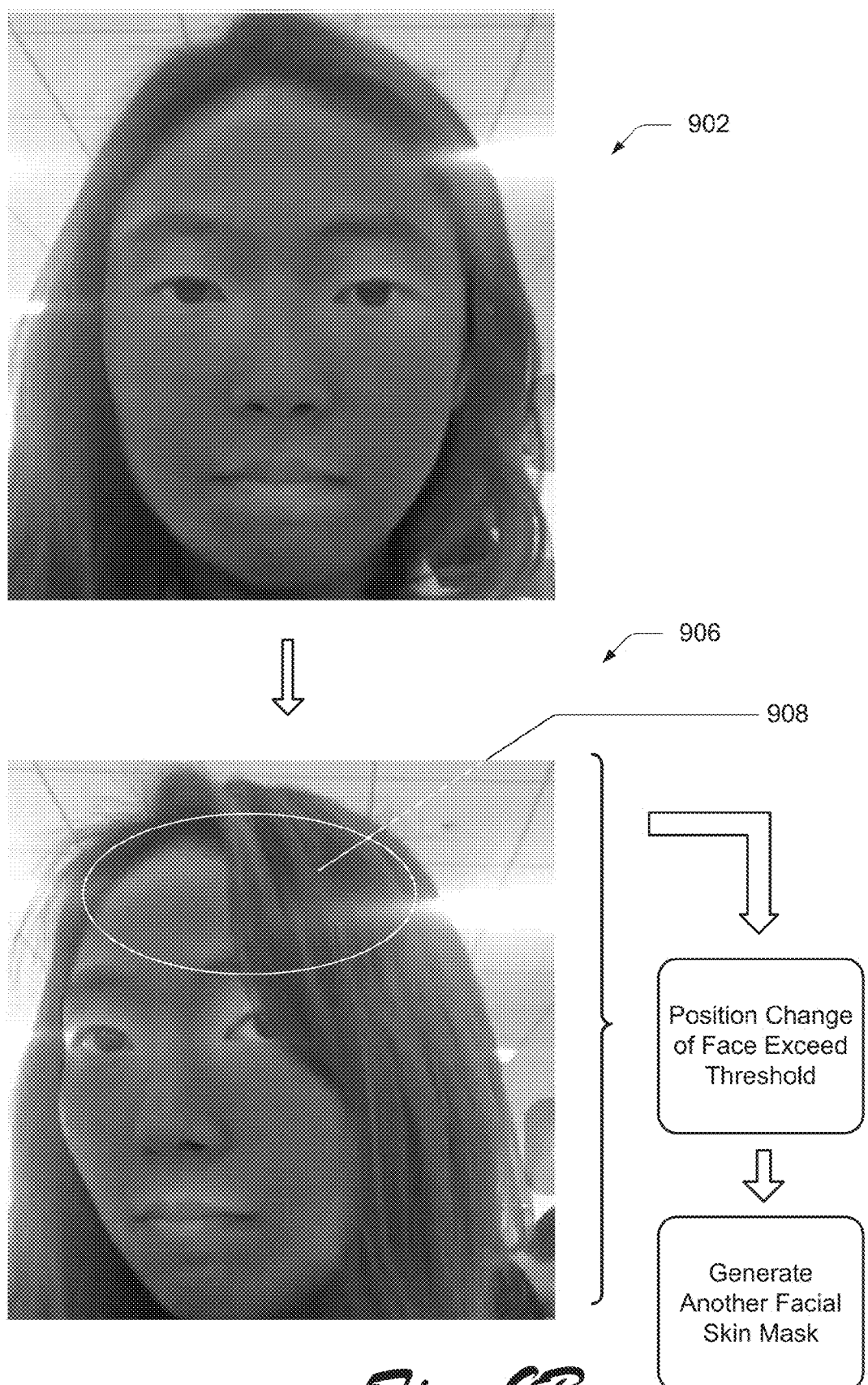
FIG. 9B depicts an example implementation of the digital content creation system that generates a new facial skin mask in real time by detecting a position change of the facial region within the digital content that satisfies the predetermined threshold.

FIGS. 9A and 9B depicts an example implementation 900 in which the digital content creation system 104 generates a facial skin mask that, unlike conventional systems, is temporally accurate, coherent, and adapts to changes in the position of the facial region. A content creator's interaction with digital content creation system 104 is illustrated in first, second, and third stages 902, 904, and 906. Specifically, FIG. 9A depicts an implementation of the digital content creation system 104.

At first stage 902, the facial skin mask generation module 106 of digital content creation system 104 generates, via computing device 102, a facial skin mask that has accurately identified skin in the facial region. At second stage 904, the facial region identification module 202 of digital content creation system 104, detects, via computing device 102, a position change in the facial region, e.g. a person moves his or her head, and compares the detected position change to a predetermined threshold. At second stage 904, the facial region identification module 202 detects the position change of the facial region to be less than or equal to the predetermined threshold and sends this information to the facial skin mask generation module 106. As the position change is less than or equal to the predetermined value, the facial skin mask generation module 106 does not regenerate the facial skin mask generated in first stage 902.

Alternatively, in third stage 906 depicted in FIG. 9B, the facial region identification module 202 detects a position change in the facial region that exceeds the predetermined threshold. The facial skin mask generation module 106 regenerates the facial skin mask based on the position change. This feature enables content creators to generate a more temporally accurate and coherent facial skin mask because a position change of the facial region might result in changes in interspersed hair and skin in the forehead, among other regions. Specifically, as depicted in FIG. 9B, the facial region's position change caused hair 908 that was previously absent from the facial region to appear in the region. As such, the facial skin mask generation module 106 will generate a new facial skin mask that more accurately identifies skin present in the facial region by, for example, excluding hair that has newly appeared on the facial region due to the position change in the facial region.

In this way, the digital content creation system described herein overcomes another limitation of conventional systems—the inability for conventional systems to detect, in real time, position changes in the facial region, and make adjustments to or regenerate facial skin masks based on the detected position changes.

Example System and Device

Figure 10:
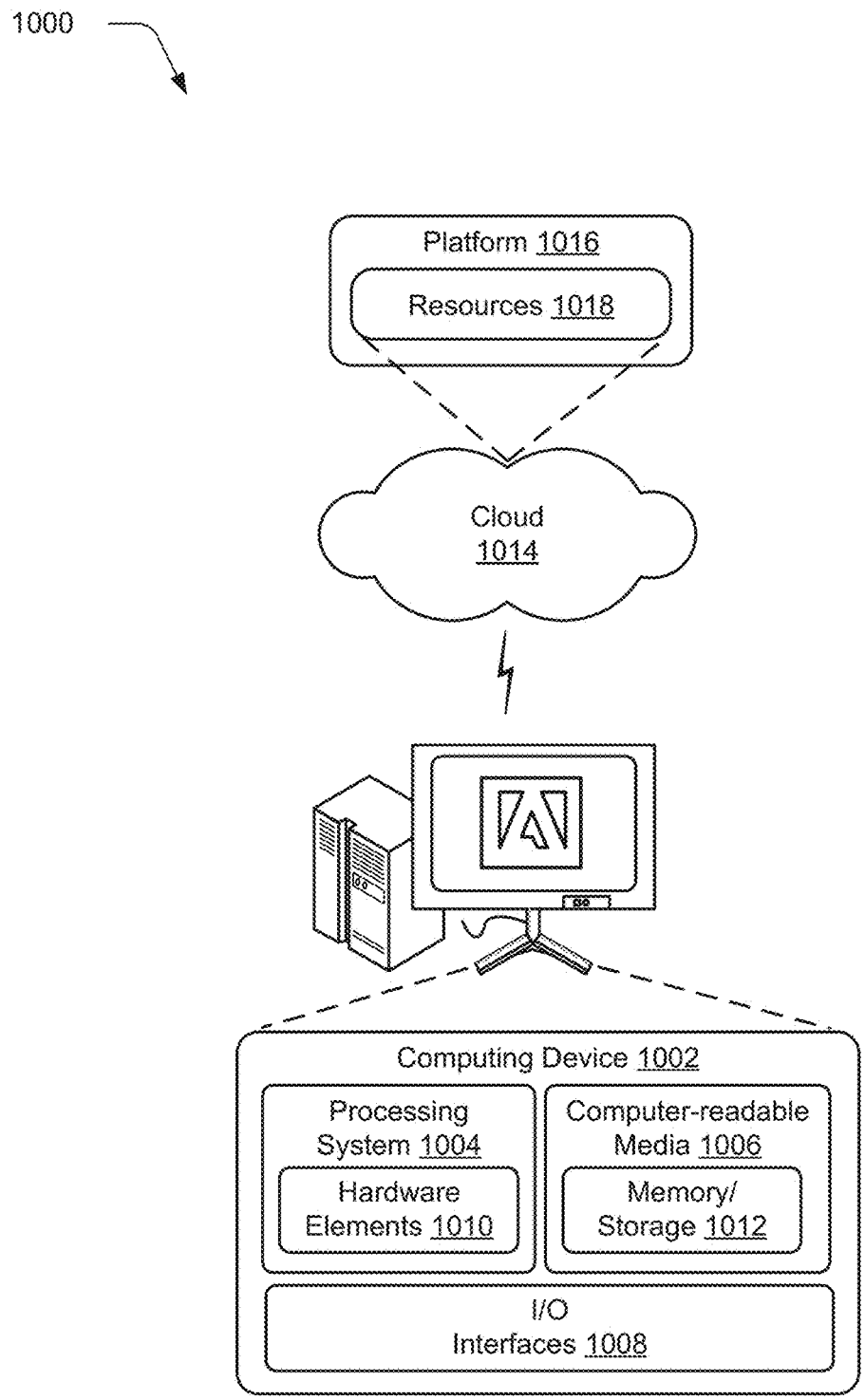
FIG. 10 illustrates an example system including various components of an example device that can be implemented as any type of computing device as described and/or utilized with references to FIGS. 1-9B to implement examples of the techniques described herein.

FIG. 10 illustrates an example system generally at 1000 that includes an example computing device 1002 that is representative of one or more computing systems and/or devices that may implement the various techniques described herein. This is illustrated through the inclusion of digital content generation system 104. The computing device 1002 may be, for example, a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interface 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware element 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1006 is illustrated as including memory/storage 1012. The memory/storage 1012 represents memory/storage capacity associated with one or more computer-readable media. The memory/storage component 1012 may include volatile media (such as random access memory (RAM)) and/or nonvolatile media (such as read only memory (ROM), Flash memory, optical disks, magnetic disks, and so forth). The memory/storage component 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1206 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of a module that is executable by the computing device 1002 as software may be achieved at least partially in hardware, e.g., through use of computer-readable storage media and/or hardware elements 1010 of the processing system 1004. The instructions and/or functions may be executable/operable by one or more articles of manufacture (for example, one or more computing devices 1002 and/or processing systems 1004) to implement techniques, modules, and examples described herein.

The techniques described herein may be supported by various configurations of the computing device 1002 and are not limited to the specific examples of the techniques described herein. This functionality may also be implemented all or in part through use of a distributed system, such as over a "cloud" 1014 via a platform 1016 as described below.

The cloud 1014 includes and/or is representative of a platform 1016 for resources 1018. The platform 1016 abstracts underlying functionality of hardware (e.g., servers) and software resources of the cloud 1014. The resources 1018 may include applications and/or data that can be utilized while computer processing is executed on servers that are remote from the computing device 1002. Resources 1018 can also include services provided over the Internet and/or through a subscriber network, such as a cellular or Wi-Fi network.

The invention claimed is:

1. In a digital medium environment, a method implemented by at least one computing device to apply a digital effect to digital content, the method comprising:
   identifying a face in the digital content;
   generating a first regional skin mask on a first region of the face and at least a second regional skin mask on a second region of the face;
   generating, before the digital effect is applied, a facial skin mask by combining the first and second regional skin masks, the facial skin mask indicative of skin of the face;
   receiving a user selection of the digital effect to be applied to the face after the first and second regional skin masks have been combined into the facial skin mask;
   modifying the digital content by applying the digital effect on the skin of the face using the facial skin mask;
   detecting a position change of the face within the digital content and comparing the position change to a predetermined threshold; and
   based on the comparing:
      generating an additional facial skin mask to use for applying the digital effect on the skin of the face if the position change exceeds the predetermined threshold; and
      retaining the facial skin mask if the position change does not exceed the predetermined threshold.

2. The method as described in claim 1, wherein the digital effect comprises at least one of digital paint, digital skin tone, digital lighting, or digital smoothing.

3. The method as described in claim 1, wherein the face in the digital content is identified based on defined landmarks.

4. The method as described in claim 1, wherein generating the first regional skin mask comprises:
   extracting a subset of landmarks from facial landmarks identified of the face, the subset of landmarks defining the first region of the face, the first region corresponding to a forehead comprising hair interspersed with skin; and
   segmenting the first region into a first segment corresponding to the hair and a second segment corresponding to the skin.

5. The method as described in claim 4, wherein segmenting the first region into the first and second segments comprises:
   identifying pixels associated with the subset of landmarks defining the first region; and processing the pixels associated with the subset of landmarks defining the first region using k-means algorithm such that the pixels corresponding to the hair of the forehead and the pixels corresponding to the skin of the forehead are separated into the first segment and the second segment, respectively.

6. The method as described in claim 4, wherein applying the digital effect to the skin of the face is effective to apply the digital effect to the second segment corresponding to the skin of the forehead.

7. The method as described in claim 1, wherein generating the second regional skin mask comprises extracting a subset of landmarks from facial landmarks identified of the face, the subset of landmarks defining the second region of the face.

8. The method as described in claim 7, further comprising tracing contours of the second region of the face based on the subset of landmarks defining the second region of the face, the contours used to identify portions of the face that correspond to the skin and portions of the face that correspond to excluded facial features.

9. The method as described in claim 8, wherein applying the digital effect to the skin of the face using the facial skin mask is effective to apply the digital effect to the portions of the face that correspond to the skin without applying the digital effect to the portions of the face that correspond to the excluded facial features.

10. The method as described in claim 1, further comprising applying the digital effect to the skin of the face using the additional facial skin mask.

11. In a digital medium environment, a system configured to apply a digital effect to digital content, the system comprising:
   a facial region identification module implemented at least partially in hardware of a computing device to identify a face in the digital content;
   a first regional skin mask generation module implemented at least partially in hardware of the computing device to generate a first regional skin mask on a first region of the face;
   a second regional skin mask generation module implemented at least partially in hardware of the computing device to generate a second regional skin mask on a second region of the face;
   a facial skin mask generation module implemented at least partially in hardware of the computing device to generate a facial skin mask by combining the first and second regional skin masks, the facial skin mask indicative of skin of the face;
   a digital effect input module implemented at least partially in hardware of the computing device to receive a user selection of the digital effect to be applied to the face after the first and second regional skin masks have been combined into the facial skin mask;
   the facial skin mask generation module further implemented to modify the digital content by applying the digital effect on the skin of the face using the facial skin mask;
   the facial region identification module further implemented to detect a position change of the face within the digital content and compare the position change to a predetermined threshold; and
   the facial skin mask generation module further implemented to generate an additional facial skin mask if the position change exceeds the predetermined threshold and retain the facial skin mask if the position change does not exceed the predetermined threshold.

12. The system as described in claim 11, wherein the digital effect comprises at least one of digital paint, digital skin tone, digital lighting, or digital smoothing.

13. The system as described in claim 11, wherein the face in the digital content is identified based on landmarks.

14. The system as described in claim 11, wherein the first regional skin mask generation module generates the first regional skin mask by:
   extracting a subset of landmarks from facial landmarks identified of the face, the subset of landmarks defining the first region of the face, the first region corresponding to a forehead comprising hair interspersed with skin; and
   segmenting the first region into a first segment corresponding to the hair and a second segment corresponding to the skin.

15. The system as described in claim 14, wherein the first regional skin mask generation module segments the first region into the first and second segments by:
   identifying pixels associated with the subset of landmarks defining the first region; and
   processing the pixels associated with the subset of landmarks defining the first region using k-means algorithm such that the pixels corresponding to the hair of the forehead and the pixels corresponding to the skin of the forehead are separated into the first segment and the second segment, respectively.

16. The system as described in claim 14, wherein the facial skin mask generation module is further implemented to apply the digital effect to the skin of the face by applying the digital effect to the second segment corresponding to the skin of the forehead.

17. The system as described in claim 11, wherein the second regional skin mask generation module generates the second regional skin mask by:
   extracting a subset of landmarks from facial landmarks identified of the face, the subset of landmarks defining the second region of the face; and
   tracing contours of the second region of the face based on the subset of landmarks defining the second region of the face, the contours used to identify portions of the face that correspond to the skin and portions of the face that correspond to excluded facial features.

18. The system as described in claim 17, wherein the facial skin mask generation module is further implemented to apply the digital effect to portions of the face that correspond to the skin without applying the digital effect to the portions of the face that correspond to the excluded facial features.

19. In a digital medium environment, an apparatus configured to apply a digital effect to digital content, the apparatus comprising:
   a facial region identification means for identifying a facial region in the digital content, detecting a position change of the facial region within the digital content, and comparing the position change to a predetermined threshold;
   a first regional skin mask generation means for generating a first regional skin mask on a first region of the facial region;
   a second regional skin mask generation means for generating a second regional skin mask on a second region of the facial region;
   a facial skin mask generation means for generating a facial skin mask by combining the first and second regional skin masks, the facial skin mask indicative of skin of the facial region, the facial skin mask generation means further for:
  generating an additional facial skin mask if the position change exceeds the predetermined threshold; and
  retaining the facial skin mask if the position change is less than the predetermined threshold;
a digital effect input means for receiving a user selection of the digital effect to be applied to the facial region; and
the facial skin mask generation means for modifying the digital content by applying the digital effect on the skin of the facial region using the facial skin mask.

20. The apparatus as described in claim 19, wherein the facial skin mask generation means applies the digital effect on the skin of the facial region using both the facial skin mask and the additional facial skin mask.

* * * * *